(12) United States Patent
Pereira et al.

(10) Patent No.: US 6,434,845 B1
(45) Date of Patent: Aug. 20, 2002

(54) DUAL-AXIS STATIC AND DYNAMIC FORCE CHARACTERIZATION DEVICE

(75) Inventors: Paulo H. Pereira, Peoria, IL (US); Ashok Muralidhar, Minneapolis, MN (US); Robert J. Hocken, Concord, NC (US); Jimmie A. Miller, Salisbury, NC (US); Stuart Smith, Charlotte, NC (US)

(73) Assignee: University of North Carolina at Charlotte, Charlotte, NC (US)

( * ) Notice: Subject to any disclaimer, the term of this patent is extended or adjusted under 35 U.S.C. 154(b) by 46 days.

(21) Appl. No.: 09/654,620

(22) Filed: Sep. 5, 2000

(51) Int. Cl.$^7$ ............................................... G01C 25/00
(52) U.S. Cl. .............................. 33/502; 33/503; 73/1.79
(58) Field of Search ........................ 33/502, 503, 556, 33/557, 558, 559, 560, 561; 73/1.01, 1.79

(56) References Cited

U.S. PATENT DOCUMENTS

| | | | | |
|---|---|---|---|---|
| 4,819,195 A | * | 4/1989 | Bell et al. | 33/502 |
| 5,501,096 A | | 3/1996 | Stettner et al. | |
| 5,623,766 A | * | 4/1997 | Ruck et al. | 33/561 |
| 6,058,618 A | * | 5/2000 | Hemmlgarn et al. | 33/503 |
| 6,062,778 A | * | 5/2000 | Szuba et al. | 408/156 |

OTHER PUBLICATIONS

S.T. Smith "Elliptical Flexure Hinges", *American Institute of Physics*, pp. 1474–1483, Mar. 1997.
J. M. Paros et al. "How to Design Flexure Hinges", *Gyrodynamics Research*, pp. 151–156, Nov. 25, 1965.
J. Ni et al. "Coordinate Measuring Machines", *Coordinate Measuring Machines and Systems*, pp. 39–56, 159, 167–169, 1995.
S.T. Smith "Foundations of Ultraprecision Mechanism", *Gordon and Breach Science Publishers*, pp. 104–117, 1992.

* cited by examiner

*Primary Examiner*—Diego Gutierrez
*Assistant Examiner*—Travis Reis
(74) *Attorney, Agent, or Firm*—Kinney & Lange, P.A.

(57) ABSTRACT

A force characterization device utilizes a flexure having a compliant portion and a solid portion. During operation of a coordinate measuring machine (CMM) on the solid portion of the flexure, a first capacitance probe detects displacement of the solid portion of the flexure in a first dimension and a second capacitance probe detects displacement of the solid portion of the flexure in a second dimension perpendicular to the first dimension. The detected displacements in the first and second dimensions of the solid portion of the flexure are correlated to forces applied to the flexure in the first and second dimensions based on the detected displacements and the predetermined spring constant of the compliant portion of the flexure. A total applied force is determined based on the forces applied to the flexure in the first and second dimensions. The flexure may be utilized for touch-trigger operations or scanning operations of the CMM. For scanning operations, a normal force applied and a coefficient of friction between the contact probe of the CMM and the solid portion of the flexure may be determined from the total applied force and the forces applied in the first and second dimensions.

15 Claims, 7 Drawing Sheets

DUAL-AXIS STATIC AND DYNAMIC FORCE CHARACTERIZATION DEVICE

BACKGROUND OF THE INVENTION

The present invention relates to a force characterization device, and more particularly to a test flexure for use with a coordinate measuring machine (CMM) or other contact measuring instrument to gauge the force applied by the measuring probe.

CMMs are extremely useful devices for identifying and certifying the shape and dimensions of a variety of mechanical components. These devices typically include a mechanical contact probe that is positioned through a support structure and applies a contact force to the component under test. The CMM may operate in a touch-trigger mode (also known as a switching mode), in which the probe is simply positioned to contact the component under test at a number of discrete coordinates, or in a scanning mode (also known as a continuous measuring mode), in which the probe moves in continuous contact across the component under test while measuring the position of the probe. In either mode of operation, the function of the CMM is to determine the shape and dimensions of the component under test based on the position of the contact probe. The contact nature of the system results in forces of varying magnitude and direction being applied to the component. In the scanning mode, the probe may move at velocities as high as 100 millimeters per second, which tends to cause rather significant variations in the contact force applied by the probe to the component under test. Since these force variations tend to degrade the quality of the measurement results in the absence of a compensation scheme of some kind, the CMM must be operated at slower speeds for measurements to be reliable and accurate, which increases the time required to perform a measurement cycle.

Accordingly, there is a need in the art for a force characterization device that is operable with a CMM to measure contact forces, and particularly to determine the dynamic force variations of the contact probe in the continuous scanning mode of operation.

BRIEF SUMMARY OF THE INVENTION

The present invention is a force characterization device utilizing a flexure-based element, herein after referred to as a "flexure," having a compliant portion and a solid portion. During operation of a coordinate measuring machine (CMM) on the solid portion of the flexure, a first capacitance probe detects displacement of the solid portion of the flexure in a first dimension and a second capacitance probe detects displacement of the solid portion of the flexure in a second dimension perpendicular to the first dimension. The detected displacements in the first and second dimensions of the solid portion of the flexure are correlated to forces applied to the flexure in the first and second dimensions based on the detected displacements and the predetermined spring constant of the compliant portion of the flexure. A total applied force is determined based on the forces applied to the flexure in the first and second dimensions. The flexure may be utilized for touch-trigger operations or scanning operations of the CMM. For scanning operations, a normal force applied and a coefficient of friction between the contact probe of the CMM and the solid portion of the flexure may be determined from the total applied force and the forces applied in the first and second dimensions.

While the above-identified drawings set forth several preferred embodiments, other embodiments of the present invention are also contemplated, as noted in the discussion below. This disclosure presents illustrative embodiments of the present invention by way of representation and not limitation. Numerous other modifications and embodiments can be devised by those skilled in the art which fall within the scope and spirit of the principles of this invention.

DETAILED DESCRIPTION

Figure 1:
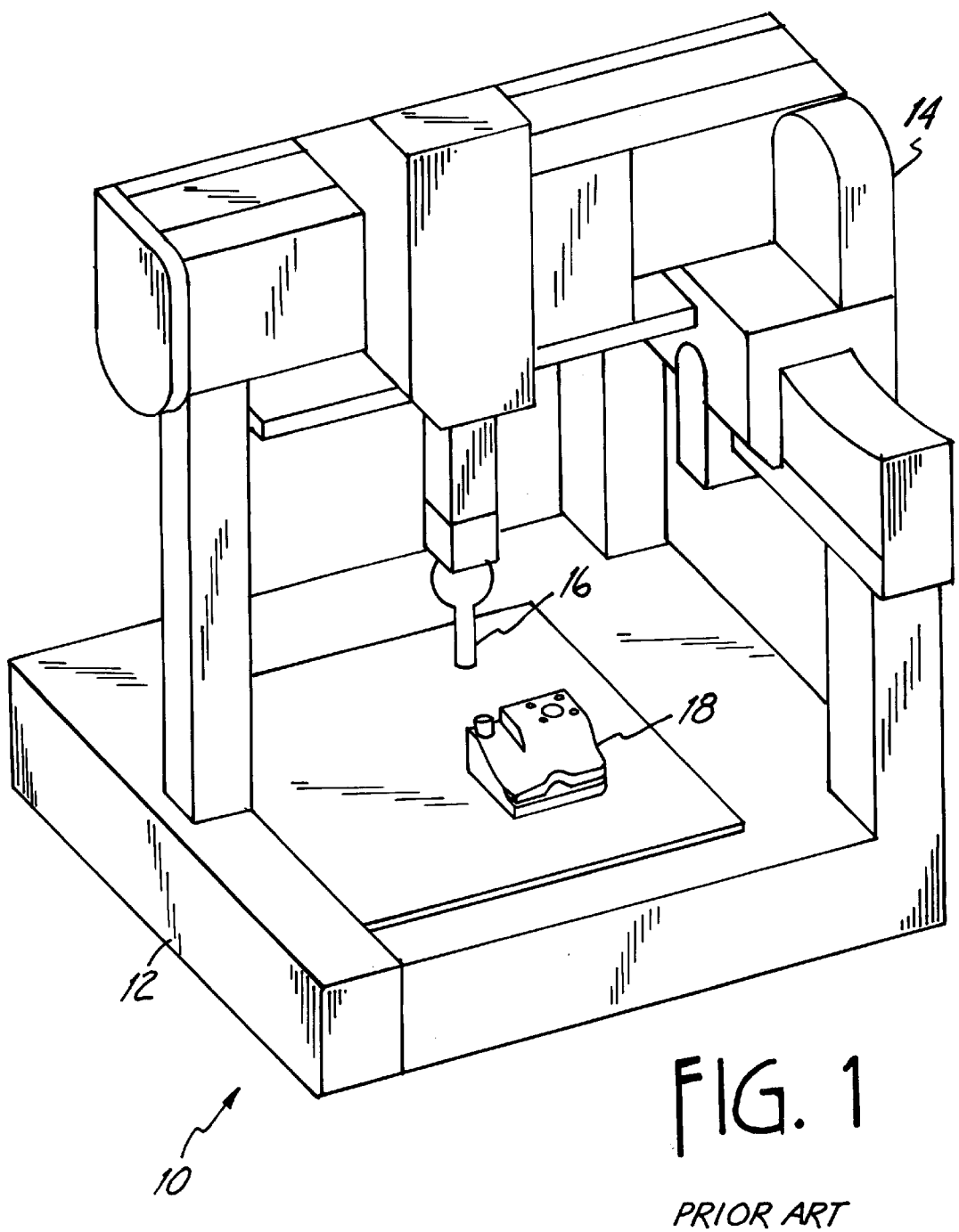
FIG. 1 is a perspective view of a coordinate measuring machine (CMM) with which the present invention is designed to operate.

FIG. 1 is a perspective view of a coordinate measuring machine (CMM) 10 with which the present invention is capable of operating. CMM 10 includes base 12 and probe support structure 14 carrying and positioning probe 16 over base 12. Component 18 is located on base 12 in order to measure the dimensions of component 18. In operation, support structure 14 is directed under computer control to position probe 16 with respect to component 18 so as to apply a contact force to component 18. The contact forces applied by probe 16 to component 18 may be either discrete contacts (touch-trigger mode) or continuous contact (scanning mode) across the surface of component 18. CMM 10 records the dimensional coordinates at which the contact forces between probe 16 and component 18 occur in order to precisely measure the dimensions of component 18.

In the touch-trigger mode of operation of CMM 10, sufficient force must be generated between probe 16 and component 18 to unequivocally register contact therebetween. Particularly for applications where component 18 is fragile, the forces due to contact between probe 16 and component 18 could potentially damage component 18. Therefore, it would be useful to provide a device to enable the magnitude of the contact forces to be measured prior to a measuring operation of CMM 10.

In the scanning mode of operation of CMM 10, probe 16 may be subjected to relatively high accelerations when CMM 10 is operated at high speeds (greater than about 20 millimeters per second (mm/sec)) which cause significant variations in the contact forces between probe 16 and component 18. As a result, the accuracy of the measurements made by CMM 10 are degraded, and the speed of operation must be reduced to ensure that accurate measurements can be made. Thus, the full scanning speed capability of CMM 10 cannot be used in the absence of a system for predicting the dynamic behavior of probe 16 during high speed operation in order to compensate for the dynamic errors associated with such high speed operation. In order to realize such a system, a force characterization device for use with CMM 10 is needed.

Figure 2A:
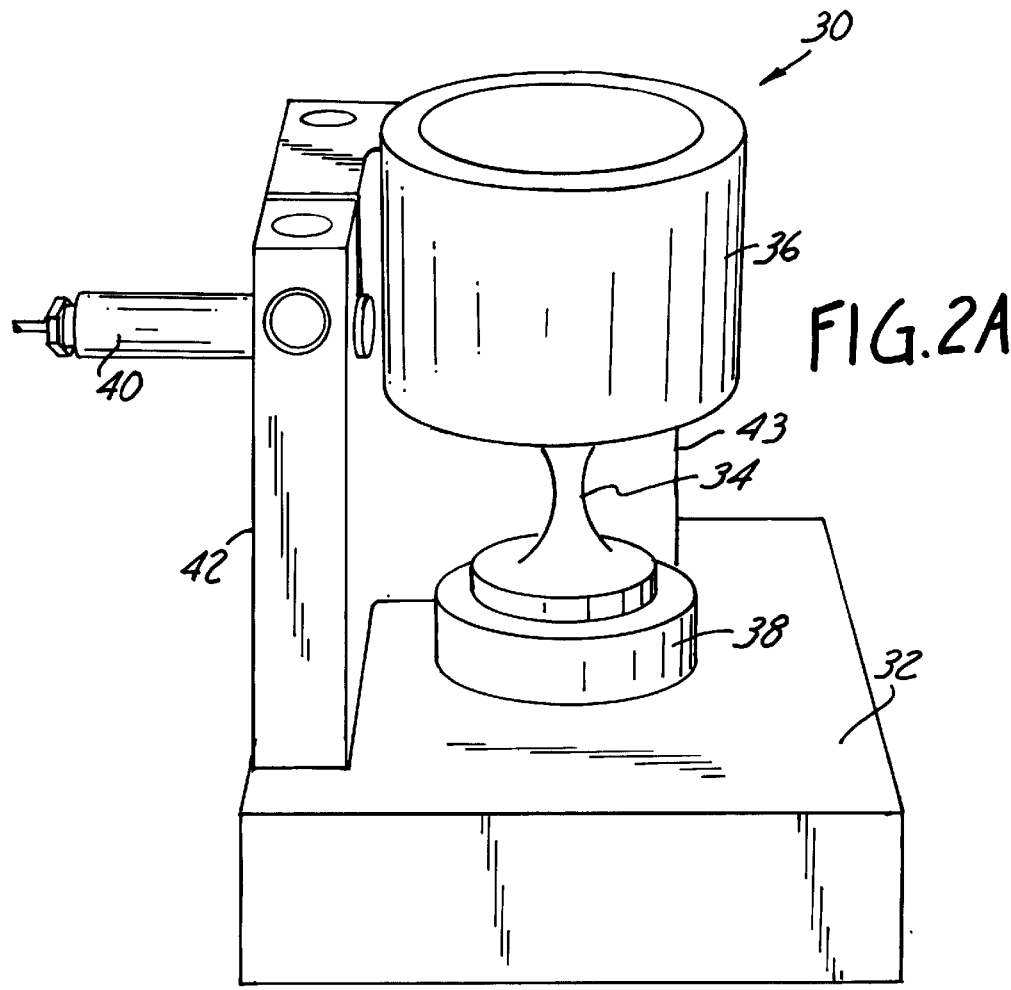
FIG. 2A is a perspective view of a test flexure mounted on a fixture according to the present invention.
Figure 2B:
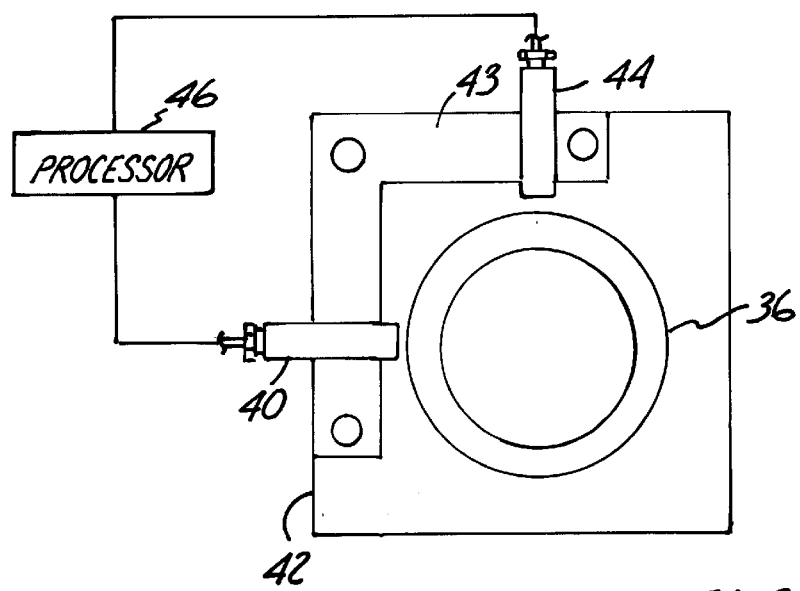
FIG. 2B is a top view of the test flexure mounted on the fixture as shown in FIG. 2A.

FIG. 2A is a perspective view, and FIG. 2B is a top view, of test flexure 30 mounted on fixture 32 in accordance with an embodiment of the present invention. Flexure 30 is compliant about notch 34 longitudinally disposed between flexure cylinder 36 and flexure base 38 attached to fixture 32. Capacitance probe 40 is provided in wall 42 of fixture 32 to measure the air gap between wall 42 and flexure cylinder 36. A second capacitance probe 44, oriented perpendicular to capacitance probe 40, is provided in perpendicular wall 43 of fixture 32 to measure the air gap between wall 43 and flexure cylinder 36. Thus, between the two capacitance probes, a two-dimensional deflection of flexure cylinder 36 may be determined.

In operation, contact between a coordinate measuring machine probe (such as probe 16, FIG. 1) causes deflection of flexure cylinder 36 about notch 34, which in turn causes the air gap distance between flexure cylinder 36 and capacitance probes 40 and 44 to change. The variation of the air gap between flexure cylinder 36 and capacitance probes 40 and 44 is representative of the force applied to flexure cylinder 36, based on the spring constant of notch 34, as long as the elastic deformation limit of notch 34 is not surpassed and flexure cylinder 36 is not forced into contact with either of walls 42 and 43 of fixture 32. The capacitance is measured, converted to a displacement, and correlated to a force applied based on the known spring constant of notch 34 by processor 46 in a manner known in the art, according to the following equations:

$$C = \frac{\varepsilon_0 A}{d} \quad \text{(Eq. 1)}$$

$$F = (d_0 - d)k \quad \text{(Eq. 2)}$$

where C is the capacitance of the capacitive sensor, $\varepsilon_0$ is the permittivity constant of the air between the capacitive sensor and the flexure body, A is the area of the capacitive sensor plate, $d_0$ is the at-rest gap distance between the capacitive sensor plate and the flexure body, d is the dynamic gap distance between the capacitive sensor plate and the flexure body, k is the spring constant of the flexure notch, and F is the force applied to the flexure by the contact probe. Flexure cylinder 36 may be contacted by the CMM probe on its outer surface or on its inner surface, in touch-trigger mode or in scanning mode, to model the forces applied by the probe in operation of the CMM.

Figure 3:
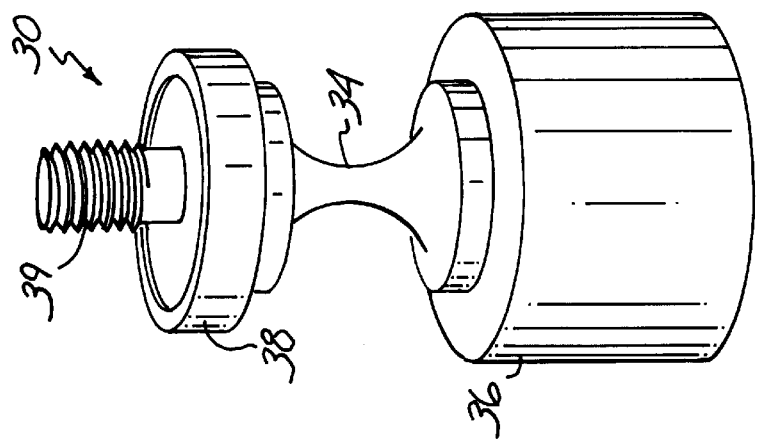
FIG. 3 is a perspective view of a test flexure according to a first embodiment of the present invention.

FIGS. 3–6 are perspective views of test flexures 30, 50, 60 and 70, respectively, according to various embodiments of the present invention. As shown in FIG. 3, test flexure 30 includes notch 34 between flexure cylinder 36 and base 38. Base 38 is mountable to fixture 32 (FIG. 2) by integral threaded screw 39. Notch 34 is a beam generally shaped like a hyperboloid, having circular lateral cross-sectional diameters at the ends that decrease toward the longitudinally central portion between the ends. In an exemplary embodiment, flexure 30 is composed of Aluminum-6061 and is hard anodized to prevent wearing of the contacting surfaces thereof.

Figure 4:
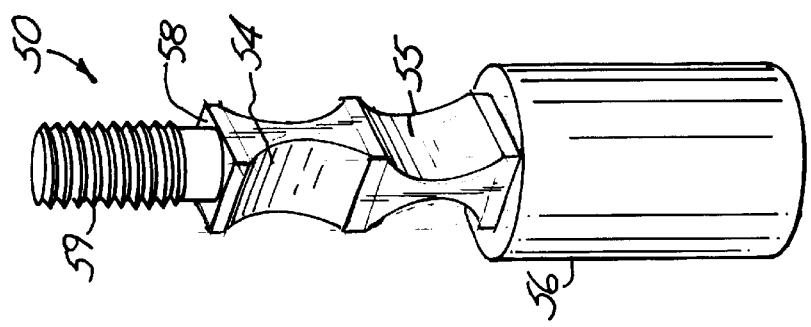
FIG. 4 is a perspective view of a test flexure according to a second embodiment of the present invention.

FIG. 4 shows flexure 50 having notches 54 and 55 between flexure cylinder 56 and base 58. Flexure 50 is mountable to fixture 32 (FIG. 2) by integral threaded screw 59. Notches 54 and 55 are prismatically shaped, with notch 54 having a narrowed cross-section in a first plane and notch 55 having a narrowed cross-section in a second plane perpendicular to the first plane. Notches 54 and 55 are beams having square lateral cross-sections at their ends that decrease toward a rectangular central portion longitudinally disposed between the ends. In an exemplary embodiment, flexure 50 is composed of Aluminum-6061 and is hard anodized to prevent wearing of the contacting surfaces thereof.

Figure 5:
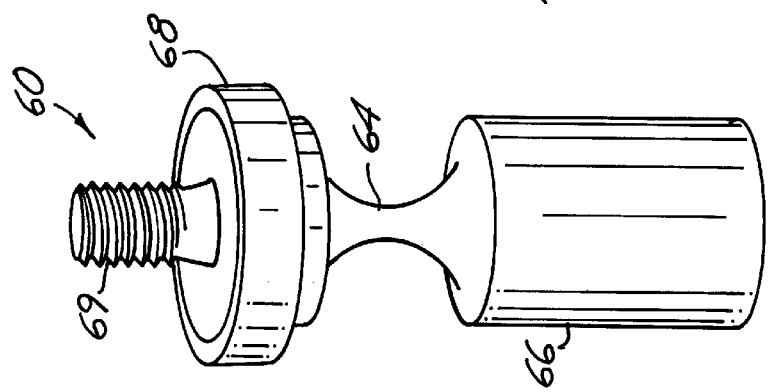
FIG. 5 is a perspective view of a test flexure according to a third embodiment of the present invention.

FIG. 5 shows flexure 60 having notch 64 between flexure cylinder 66 and base 68. Base 68 is mountable to fixture 32 (FIG. 2) by integral threaded screw 69. Notch 64 is a beam generally shaped like a hyperboloid, having circular lateral cross-sectional diameters at the ends that decrease toward the longitudinally central portion between the ends. In an exemplary embodiment, flexure 60 is composed of Aluminum-6061 and is hard anodized to prevent wearing of the contacting surfaces thereof. Notch 64 is typically not anodized, to avoid any potential variations in the spring constant. Flexure 60 is similar in many respects to flexure 30 shown in FIG. 3, except that flexure cylinder 66 has a smaller diameter than flexure cylinder 36. Thus, similar scanning velocities employed with flexures 30 and 60 will result in different centripetal accelerations, yielding different force characteristics for testing purposes.

Figure 6:
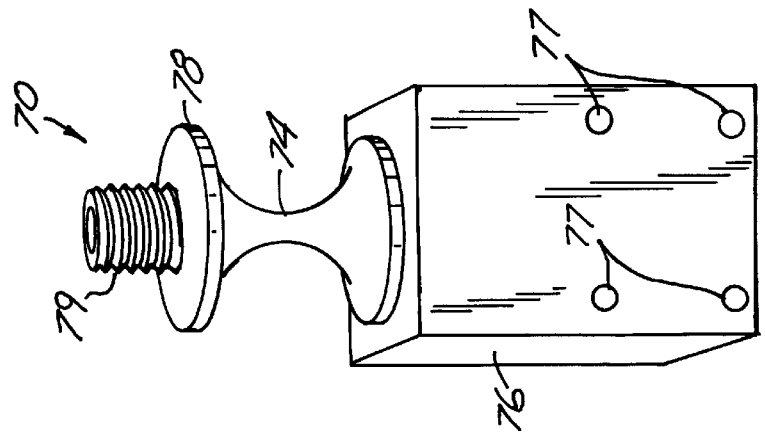
FIG. 6 is a perspective view of a test flexure according to a fourth embodiment of the present invention.

FIG. 6 shows flexure 70 having notch 74 between flexure body 76 and base 78 having integral threaded screw 79 for mounting to fixture 32 (FIG. 2). Notch 74 is a beam generally shaped like a hyperboloid, having circular lateral cross-sectional diameters at the ends that decrease toward the longitudinally central portion between the ends. Flexure body 76 includes a plurality of threaded holes 77 for mounting of a sample material thereto. For ease of mounting the sample material, flexure body 76 is typically prismatic in shape rather than cylindrical, as illustrated in FIG. 6. This configuration allows the sample material to be scanned and the frictional coefficient for that particular material to be evaluated by measuring the deflection of flexure body 76 about notch 74. In an exemplary embodiment, flexure 70 is composed of Aluminum-6061, but is typically not anodized since no surface of flexure 70 itself is contacted during operation.

Figure 7:
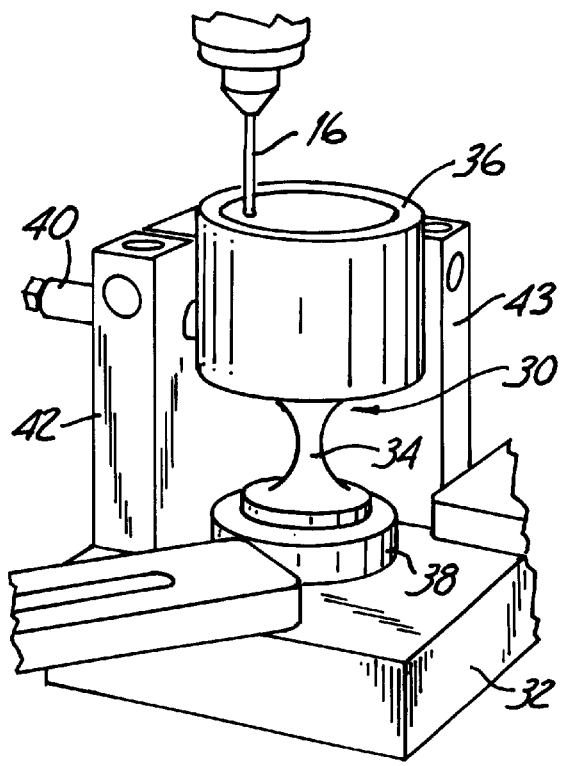
FIG. 7 is a perspective view illustrating a test flexure according to the present invention in operation with a CMM having a contact probe arranged to contact the inner surface of the test flexure.
Figure 8:
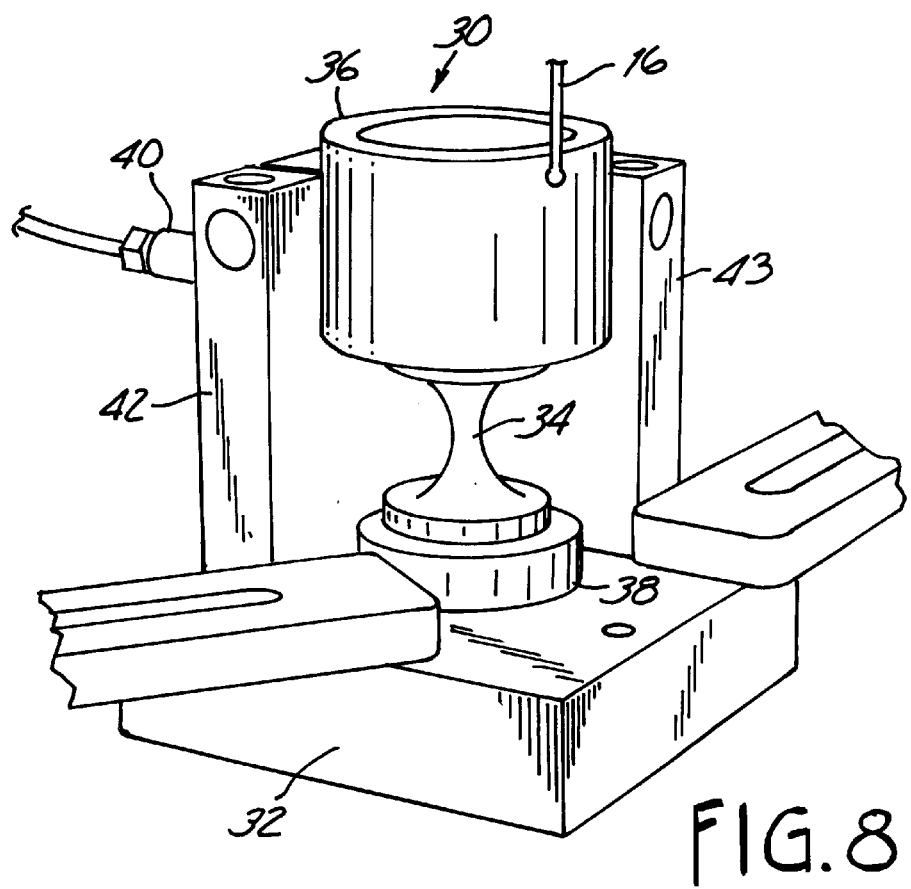
FIG. 8 is a perspective view illustrating a test flexure according to the present invention in operation with a CMM having a contact probe arranged to contact the outer surface of the test flexure.

FIGS. 7 and 8 are perspective views illustrating test flexure 30 of an embodiment of the present invention in operation with a CMM employing contact probe 16. FIG. 7 shows an operation where probe 16 is positioned within the inner diameter of flexure cylinder 36, contacting the inner surface of flexure cylinder 36. FIG. 8 shows an operation where probe 16 is positioned outside of the outer diameter of flexure cylinder 36, contacting the outer surface of flexure cylinder 36. In either case, the position and movement of probe 16 may be controlled in a touch-trigger mode to contact test flexure 30 at discrete points thereon, or in a scanning mode to continuously contact test flexure 30 as probe 16 scans the surface of test flexure 30. Forces applied by probe 16 to flexure cylinder 36 are determined by measuring the deflection of flexure cylinder 36 at first capacitance probe 40 and second capacitance probe 44, oriented in planes perpendicular to one another on perpendicular walls 42 and 43 of fixture 32. The deflection of flexure cylinder 36 in the two axes measured by capacitance probes 40 and 44 is representative of the forces applied by probe 16, based on the known spring constant of notch 34.

Figure 9:
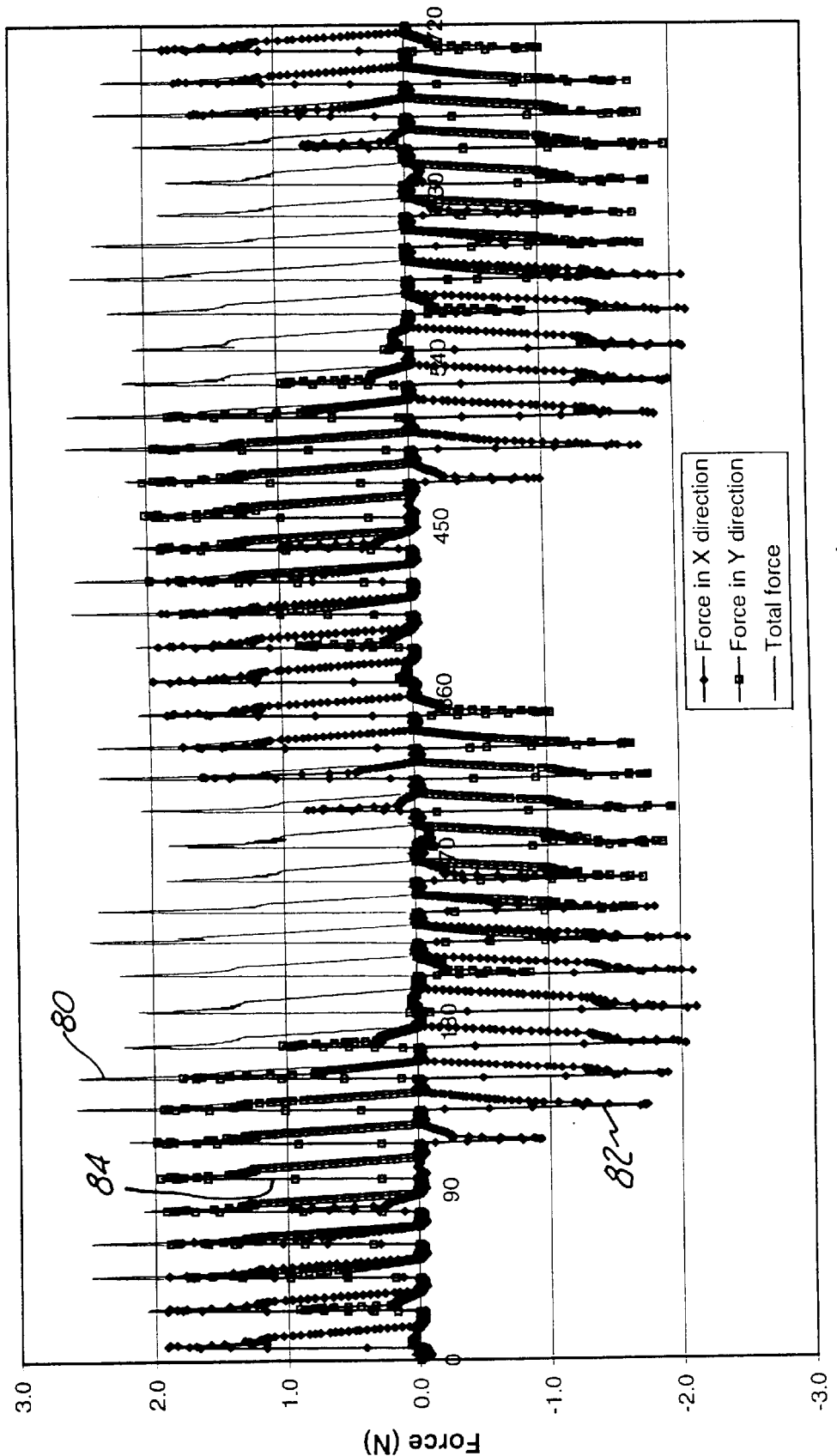
FIG. 9 is a graph illustrating the results of testing performed with the test flexure of the present invention during a touch-trigger mode of operation of the CMM.
Figure 10:
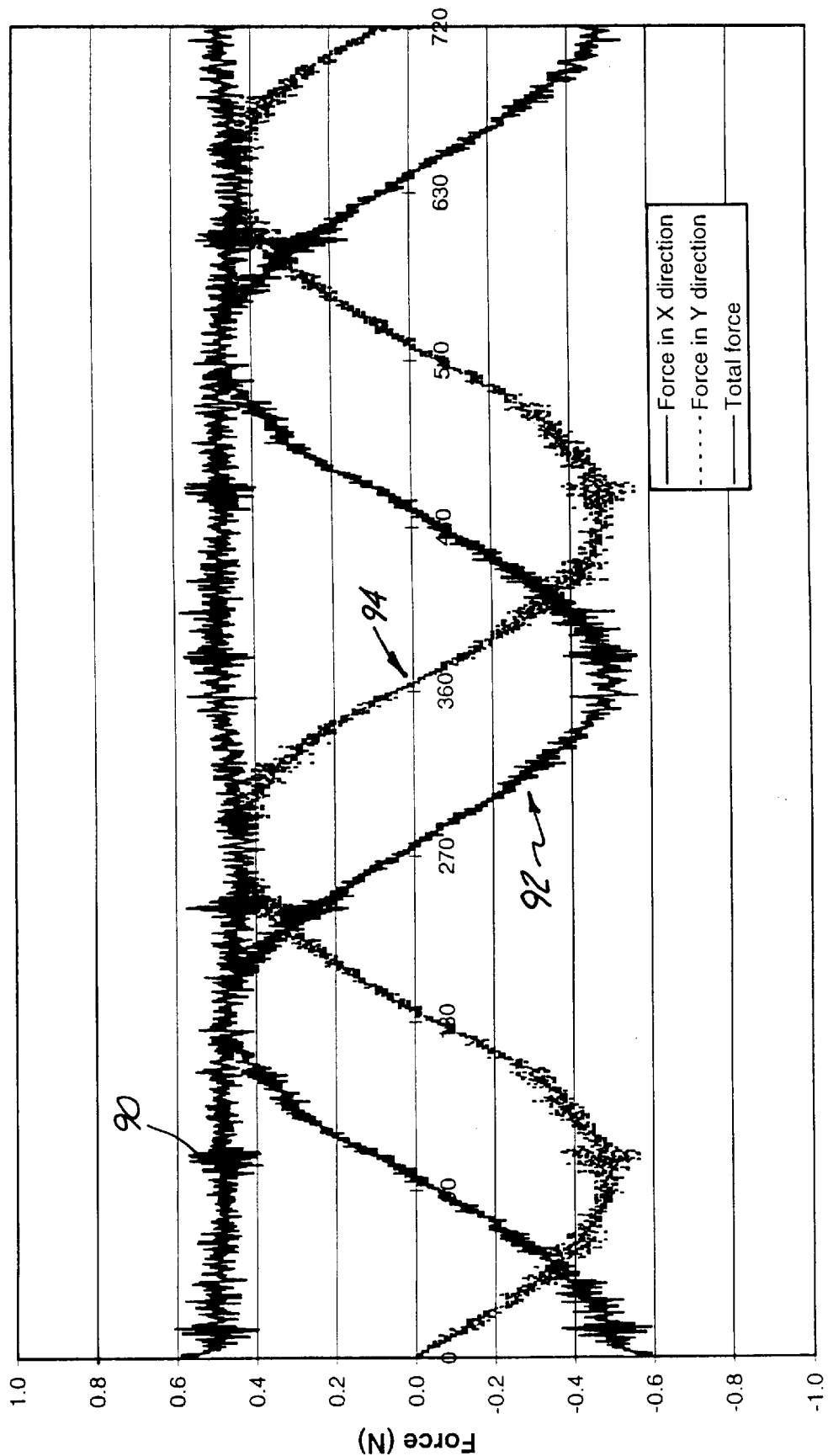
FIG. 10 is a graph illustrating the results of testing performed with the test flexure of the present invention during a closed-loop scanning mode of operation of the CMM.
Figure 11:
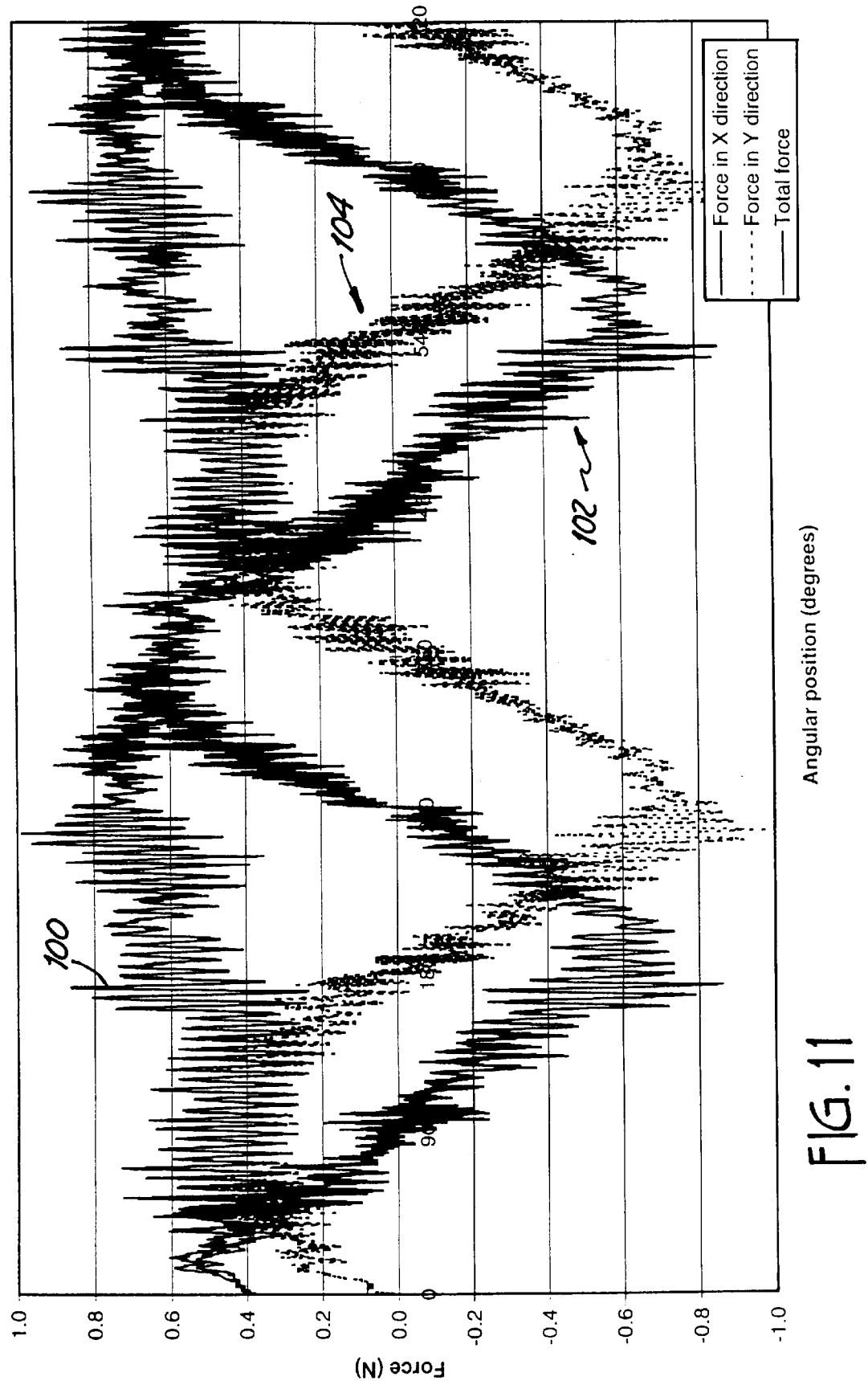
FIG. 11 is a graph illustrating the results of testing performed with the test flexure of the present invention during an open-loop scanning mode of operation of the CMM.

FIGS. 9–11 are graphs illustrating the results of testing operations performed with a test flexure according to the present invention. FIG. 9 shows measured forces during a touch-trigger mode of operation of the CMM applied to test flexure 30 arranged as shown in FIG. 8, with the contact probe positioned outside of flexure cylinder 36. The contact probe of the CMM applies force to flexure cylinder 36 (FIG. 8) with 'x' and 'y' components, which are individually measured by the two capacitance probes, determining the displacement in the 'x' and 'y' directions of flexure cylinder 36 and correlating the displacement to the force applied by virtue of the known spring constant of notch 34 in flexure 30. In addition, from the 'x' and 'y' components of the force applied, a total force applied may be determined according to the following equation:

$$F_t = (F_x^2 + F_y^2)$$ (Eq.3)

where $F_t$ is the total force, $F_x$ is the 'x' component of the force applied, and $F_y$ is the 'y' component of the force applied. The total force is shown by curve 80 in FIG. 9, obtained according to equation (1) from the force in the 'x' direction (curve 82) and the force in the 'y' direction (curve 84) which are derived from the 'x' and 'y' measurements of the capacitance probes and the spring constant of flexure notch 34, in a test operation having forty discrete measurement points distributed over 720° (two turns) of cylinder 36 of test flexure 30. The graph illustrates that the contact probe being tested experiences a variation of about 0.5 Newtons (N) in the force applied to flexure 30, which could potentially introduce problems for fragile or more flexible components to be measured. As a result, it may be necessary to reduce the threshold for registering contact with the component under test, for example, to prevent damage to the component. Other uses of the information depicted in FIG. 9 will be apparent to those skilled in the art.

FIG. 10 shows measured forces during a scanning mode of operation of the CMM applied to test flexure 30 arranged as shown in FIG. 8, with the contact probe positioned outside of flexure cylinder 36. The measurements shown in FIG. 10 were obtained during a closed-loop (that is, a non-predefined scanning path) operation performed with a scan velocity of 5 mm/sec over 720° (two turns) of cylinder 36 of test flexure 30. In the closed-loop scanning mode, the CMM controller measures an unknown contour, without information as to the nominal shape of the component under test. The CMM is commanded to position the contact probe at an initial starting point, move in a specified direction, and end at a finishing point, while maintaining constant the total force applied by the contact probe to the component under test (i.e., flexure 30) and correcting the path followed by the contact probe accordingly. Thus, contact between the probe and the component under test is maintained as the probe moves.

During the scanning operation, 'x' and 'y' components of force are individually measured by the two capacitance probes, determining the displacement in the 'x' and 'y' directions of flexure cylinder 36 and correlating the displacement to the force applied by virtue of the known spring constant of notch 34 in flexure 30. In addition, from the 'x' and 'y' components of the force applied, a total force applied may be determined according to equation (1) above. The total force applied may be divided into a normal force component and a coefficient of friction component, according to the following equation:

$$F_t = \sqrt{(\mu F_n)^2 + F_n^2}$$ (Eq. 4)

where $F_n$ is the normal force component and $\mu$ is the coefficient of friction. The normal force is also given by the following equation:

$$F_n = \sqrt{\frac{F_x^2 + F_y^2}{1 + \mu^2}}$$ (Eq. 5)

Thus, the normal force and the coefficient of friction may each be determined.

The total force applied by the contact probe to flexure 30 is shown by curve 90 in FIG. 10, obtained according to equation (1) from the force in the 'x' direction (curve 92) and the force in the 'y' direction (curve 94) which are derived from the 'x' and 'y' measurements of the capacitance probes and the spring constant of flexure notch 34. Variations in the total force can therefore be tracked as the contact probe traverses the surface of flexure 30. These measured variations can be input to a model enabling accurate prediction of the dynamic behavior of the contact probe of the CMM during scanning. With the use of such a model, a compensation scheme can be implemented to correct for dynamic errors in the operation of the CMM.

Measuring the coefficient of friction between the contact probe and flexure 30 is also useful to detect buildups of material on the probe tip or other potential conditions that could cause errors in the scanning operation. Furthermore, flexure 70 may be utilized to present a textured material for scanning, such that the coefficient of friction associated with the scanning of that particular material may be determined.

FIG. 11 shows measured forces during a scanning mode of operation of the CMM applied to test flexure 60 (FIG. 5) arranged as shown in FIG. 7, with the contact probe positioned within the inner diameter of flexure cylinder 66. The measurements of FIG. 11 were obtained during an open-loop (that is, predefined scanning path) operation performed with a scan velocity of 50 mm/sec over 720° (two turns) of cylinder 66 of flexure 60. In the open-loop scanning mode, the CMM controller follows a nominal scanning path related to the general shape of the component under test, enabling higher scanning speeds to be utilized. The total force applied by the contact probe is maintained constant, with the necessary minor corrections to the path followed by the probe being made accordingly. Thus, contact between the probe and the component under test is maintained as the probe moves.

Similar to the scanning operation described above with respect to FIG. 10, 'x' and 'y' components of force are individually measured by the two capacitance probes, determining the displacement in the 'x' and 'y' directions of flexure cylinder 66 and correlating the displacement to the force applied by virtue of the known spring constant of notch 64. In addition, from the 'x' and 'y' components of the force applied, a total force applied may be determined according to equation (1) above. The total force applied may be divided into a normal force component and a coefficient of friction component, according to equation (2) above, with the normal force also being given by equation (3) above. Thus, the normal force and the coefficient of friction may each be determined.

The total force applied by the contact probe to flexure 60 is shown by curve 100 in FIG. 11, obtained according to equation (1) from the force in the 'x' direction (curve 102) and the force in the 'y' direction (curve 104) which are derived from the 'x' and 'y' measurements of the capacitance probes and the spring constant of flexure notch 64. Variations in the total force can therefore be tracked and compensated for by an appropriate model, as described above with respect to FIG. 10.

The test flexure of the present invention can therefore be utilized to measure the dynamic forces applied by a CMM contact probe during touch-trigger and scanning operations, particularly to track the variations in those forces as the CMM is operated at high speeds in the scanning operation scenario. By measuring the dynamic force variations, a modeling scheme may be employed to control the CMM in such a manner as to minimize or compensate for those potential variations during appropriate conditions of operation in order to more accurately scan the size and shape of the component. A coefficient of friction may also be determined during a test operation, to detect material buildup on the contact probe or to assess the characteristics of a particular material type as it is scanned. As a result of the testing capability afforded by the present invention, touch-trigger and scanning operations may be performed without damaging fragile components, and scanning operations may be performed at high speeds and accelerations with a higher degree of accuracy.

Although the present invention has been described with reference to preferred embodiments, workers skilled in the art will recognize that changes may be made in form and detail without departing from the spirit and scope of the invention.

What is claimed is:

1. A force characterization device, comprising:
   a device base having a first wall and a second wall perpendicular to the first wall;
   a flexure attached to the device base, the flexure having a compliant portion and a solid portion;
   a first capacitance probe attached to the first wall and a second capacitance probe attached to the second wall, the first capacitance probe being operable to detect a displacement between the solid portion of the flexure and the first wall and the second capacitance probe being operable to detect a displacement between the solid portion of the flexure and the second wall; and
   means for correlating the detected displacement between the solid portion of the flexure and the first and second walls to respective 'x' and 'y' force components applied to the solid portion of the flexure.

2. The force characterization device of claim 1, wherein the flexure includes a flexure base and the compliant portion of the flexure comprises a flexible notch between the flexure base and the solid portion of the flexure.

3. The force characterization device of claim 2, wherein the flexible notch is shaped like a hyperboloid having circular cross-sectional diameters at first and second ends that decrease toward a central portion between the first and second ends.

4. The force characterization device of claim 1, wherein the compliant portion of the flexure comprises a beam having a cross-sectional shape of one of a square, rectangle or circle.

5. The force characterization device of claim 1, wherein the flexure includes a base and the compliant portion of the flexure comprises two generally prismatically shaped flexible notches between the flexure base and the solid portion of the flexure.

6. The force characterization device of claim 1, wherein the solid portion of the flexure comprises a cylinder attached to the compliant portion of the flexure, the cylinder having an open top with an outer diameter and an inner diameter.

7. The force characterization device of claim 1, wherein the solid portion of the flexure comprises means for mounting a material piece thereto.

8. A method of tracking contact force variations during a touch-trigger operation of a coordinate measuring machine (CMM) having a CMM controller for positioning a contact probe, the method comprising:
   locating a test flexure on the CMM, the test flexure having a solid portion and a compliant portion having a predetermined spring constant;
   moving the contact probe to contact the solid portion of the test flexure at a predetermined number of points with a nominally predetermined contact force;
   measuring a displacement in two dimensions of the solid portion of the test flexure for each contact between the contact probe and the solid portion of the test flexure;
   correlating the displacement in two dimensions of the solid portion of the test flexure for each contact between the contact probe and the solid portion of the test flexure to applied forces in two dimensions by the contact probe to the solid portion of the test flexure based on the displacement and the predetermined spring constant of the compliant portion of the test flexure; and
   determining a total applied force for each contact between the contact probe and the solid portion of the test flexure from the applied forces in t o dimensions.

9. A method of tracking contact force variations during a scanning operation of a coordinate measuring machine (CMM) having a CMM controller for positioning a contact probe, the method comprising:
   locating a test flexure on the CMM, the test flexure having a solid portion and a compliment portion having a predetermined spring constant;
   moving the contact probe to contact the solid portion of the test flexure along a surface of the solid portion of the test flexure while maintaining a contact force applied by the contact probe to the solid portion of the test flexure nominally constant;
   measuring a displacement in two dimensions of the solid portion of the test flexure throughout movement of the contact probe along the surface oft e solid portion of the test flexure;
   correlating the displacement in two dimensions of the solid portion of the test flexure throughout movement of the contact probe along the surface of the solid portion of the test flexure to applied forces in two dimensions by the contact probe to the solid portion of the test flexure based on the displacement and the predetermined spring constant of the compliant portion of the test flexure; and
   determining a total applied force throughout movement of the contact probe along the surface of the solid portion of the test flexure from the applied forces in two dimensions.

10. The method of claim 9, further comprising:
    determining a normal force applied and a coefficient of friction throughout movement of the contact probe along the surface of the solid portion of the test flexure from the total applied force and the applied forces in two dimensions.

11. A force characterization device, comprising:
    a flexure body supported by a compliant flexure;

a plurality of sensing elements adjacent to the flexure body for detecting displacement of the flexure body in response to forces applied thereto;

a device support structure for mounting the flexure and the plurality of sensing elements; and means for correlating the detected displacement of the flexure body to respective 'x°' and 'y' force components applied to the flexure body.

12. The force characterization device of claim 11, wherein the compliant flexure is at least partially shaped like a conic section.

13. The force characterization device of claim 11, wherein the compliant flexure comprises a beam having a cross-sectional shape of a square, rectangle or circle.

14. The force characterization device of claim 11, wherein the flexure body comprises a cylinder having an open top with an outer diameter and an inner diameter.

15. The force characterization device of claim 11, wherein the flexure body comprises means for mounting a material piece thereto.

* * * * *